(No Model.) 2 Sheets—Sheet 1.
J. REILLY.
CONTROLLER FOR ELEVATORS.
No. 432,767. Patented July 22, 1890.
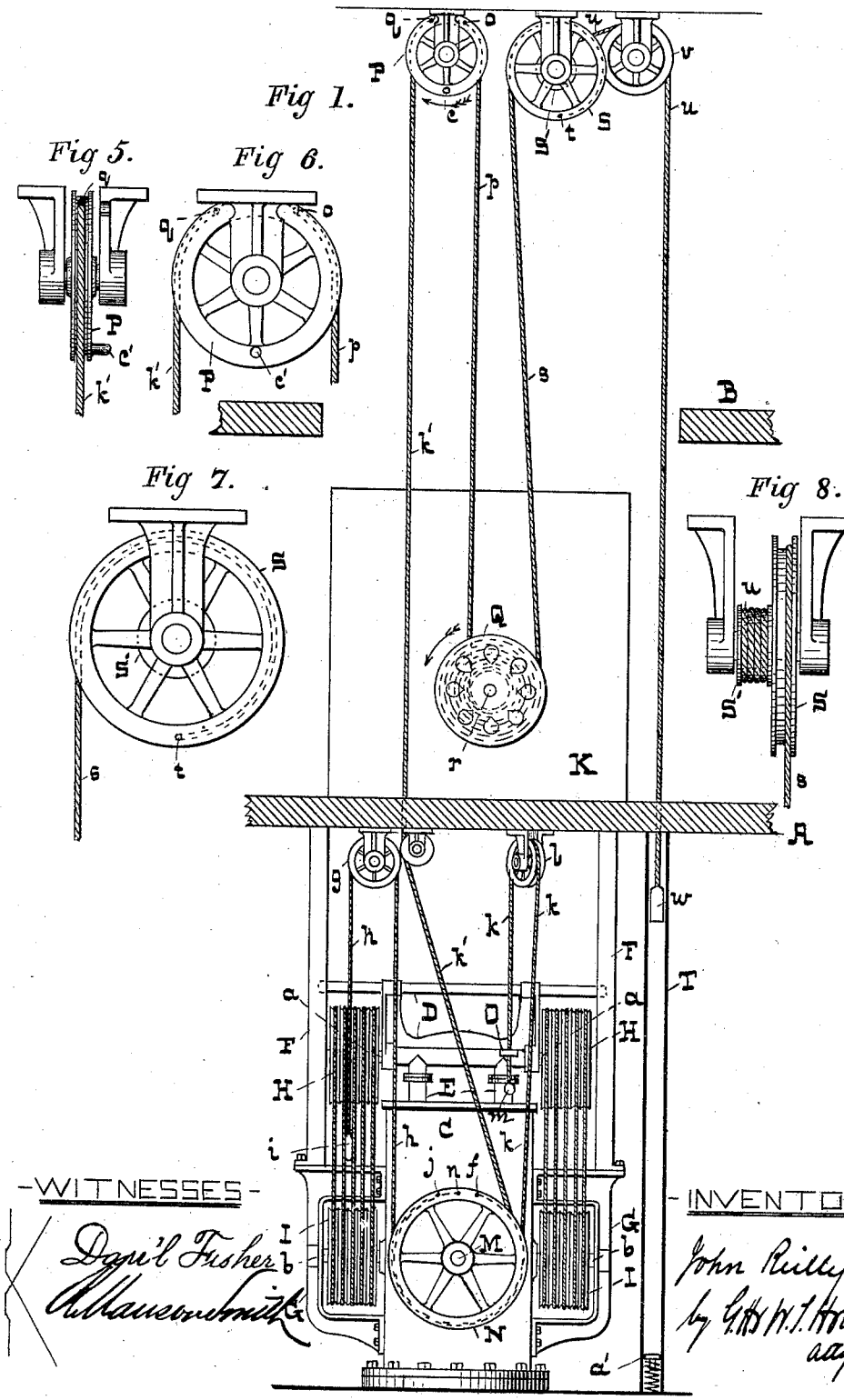
WITNESSES
Dan'l Fisher
INVENTOR
John Reilly,
by G. H. & W. T. Howard,
atty.

(No Model.) 2 Sheets—Sheet 2.
J. REILLY.
CONTROLLER FOR ELEVATORS.
No. 432,767. Patented July 22, 1890.
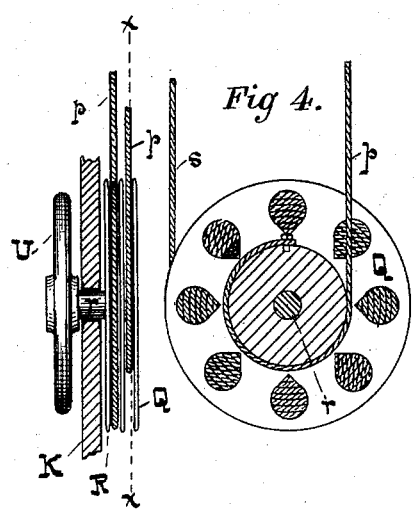
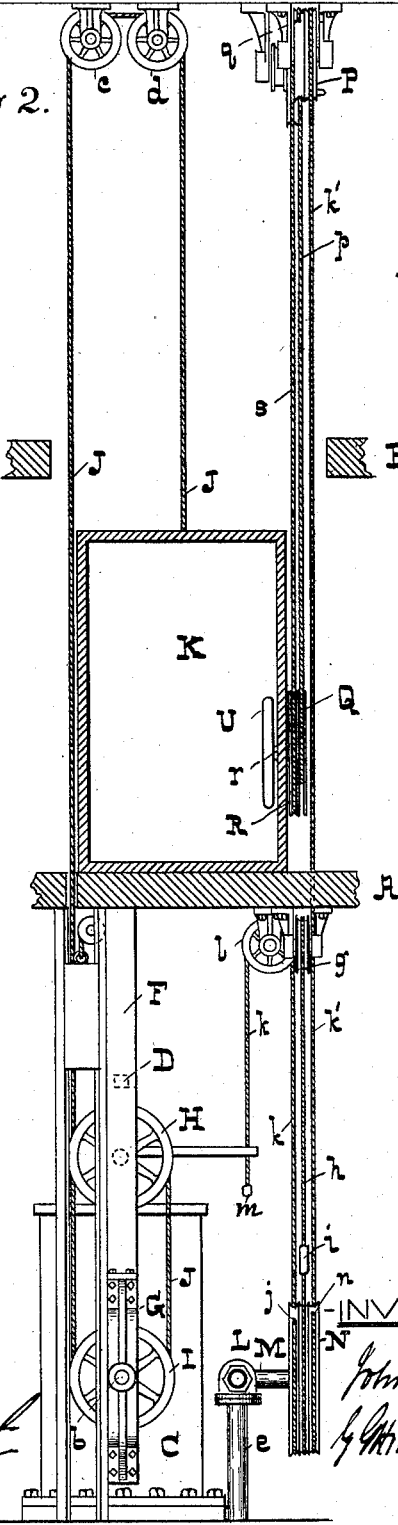

UNITED STATES PATENT OFFICE.

JOHN REILLY, OF BALTIMORE, MARYLAND.

CONTROLLER FOR ELEVATORS.

SPECIFICATION forming part of Letters Patent No. 432,767, dated July 22, 1890.

Application filed December 5, 1889. Serial No. 332,642. (No model.)

*To all whom it may concern:*

Be it known that I, JOHN REILLY, of the city of Baltimore and State of Maryland, have invented certain Improvements in Hydraulic Elevators, of which the following is a specification.

This invention relates to improved means for operating the cock or valve which controls the movement of water to and from the cylinder, as will hereinafter fully appear.

In the description of the said invention which follows reference is made to the accompanying drawings, forming a part hereof, and in which—

Figure 1 is an exterior front elevation of the apparatus, and Fig. 2 a side elevation with certain parts thereof shown in section. Figs. 3, 4, 5, 6, 7, and 8 are details of the invention, on an enlarged scale.

Similar letters of reference indicate similar parts in all the figures.

Referring to the drawings, A and B represent, respectively, the first and the second floor of the building.

C is a hydraulic cylinder, and D the cross-head connected to the piston (not shown) of the cylinder by means of piston-rods E. The ends of the cross-head enter slots (not shown) which extend longitudinally of guides F, which are bolted to frames G on the sides of the cylinder and extend therefrom to the first floor A.

H and I are sheaves, the former on spindles $a$, forming parts of the cross-head, and the latter on shafts $b$, supported in the frames G.

J is the hoisting-rope rove around the sheaves H and I, and leading therefrom over the pulleys $c$ and $d$ down to the elevator-cab K. The arrangement of the sheaves H and I is such that the movement of the piston in its application to the cab through the hoisting-rope is multiplied; in other words, a stroke of piston of, say, twelve feet gives a movement to the cab of, say, sixty feet.

A more detailed description of the elevator proper is not deemed necessary herein, as my invention is restricted to the appliances for controlling the movement of water to and from the cylinder for the purpose of starting and stopping the elevator-cab.

L is a two-way cock for primarily controlling the movement of water to and from the cylinder, and a pipe which connects this cock with the cylinder is denoted by $e$.

M is a shaft extending from the key of the cock L, upon which is secured a sheave N, having three peripheral grooves. Fastened in one of these grooves at $f$, and leading therefrom over a pulley $g$, is a cord $h$, having at its end a weight $i$, of sufficient gravity to turn the sheave, the shaft M, and key of the cock L, so as to shut off the supply of water to the cylinder and open the water-discharge, and thereby allow the piston to fall and with it the elevator-cab. Secured at $j$ in another one of the grooves is a cord $k$, and which extends over a pulley $l$ and down through a hole in an arm O, forming a part of the cross-head D with a knot or ball $m$ at its end. A third cord $k'$ is fastened at $n$ in the remaining groove of the sheave N, and passes upward to a pulley P, and secured thereto at $o$. A similar cord $p$, connected to the pulley P at $q$, leads downward, and is united to a sheave Q, keyed to a short shaft $r$, running through the side of the cab K. Another sheave R, corresponding in all essential particulars with the one Q, is also keyed to the shaft $r$, and a cord $s$ leading therefrom passes upward and is attached at $t$ to a pulley S. On this same shaft which supports the pulley S is a smaller pulley S', from which a cord $u$ leads over a pulley $v$ and down to the basement of the building, where it is provided with a weight $w$. This weight is preferably contained in a pipe T, as shown in Fig. 1, having a spring-bottom $a'$.

The sheaves Q and R are exterior of the cab, and secured to their shaft $r$, and within the cab is a hand-wheel U. These sheaves and hand-wheel are shown on an enlarged scale in Figs. 3 and 4, the latter being a section of the former taken on the dotted line $x$ $x$. The pulley P has a lug $c'$ on its edge, which limits its movement practically to a revolution by striking the sides of the hanger, which are notched to receive the lug. The pulley P and its attachments are shown on an enlarged scale in Figs. 5 and 6, which are respectively an edge and a side view.

Figs. 7 and 8 are respectively an enlarged side and an edge view of the pulleys S and S'.

The operation of the invention is as follows: Supposing the cab to be at the first floor of the building, as shown in the drawings, and it is desired to elevate it, the hand-wheel U is turned in the direction indicated by the arrow in Fig. 1, which has the effect of tightening the cord $p$ and moving the pulley P in the direction indicated by the arrow concentric with its rim. This movement of the hand-wheel is continued until the lug $c'$ strikes the side of the hanger, and the revolution of the pulley P in the direction and to the extent described serves to wind the cord $k'$ thereon and turn the sheave N sufficiently to open the cock L and permit the entrance of water under pressure to beneath the piston in the cylinder C. The cab now rises, and the cord $p$ as it slackens is wound on the sheave Q, which is revolved by the unwinding of the cord $s$ on the sheave R through the medium of the weight $w$ and its cord $u$, as the two sheaves are secured together or formed in one piece. To stop the cab the attendant places his hand on the wheel U and prevents its further revolution and any further unwinding and winding of the cords $s$ and $p$. The cord then becomes slack, and the pulley P, having nothing to hold it in its position last described, the weight $i$, through the medium of its cord $h$, turns the sheave or drum N and the key of the cock L until the passage of water to the cylinder is stopped. In this operation the lug $c'$ has been moved back to its original position or that shown in Fig. 1. To lower the cab the hand-wheel is revolved in a direction contrary to that first described until the lug $c'$ comes in contact with the other side of the hanger. By this means the cord $p$ is further slackened, and the weight $i$ though the medium of the cord $h$, sheave N, and the shaft M continues the movement of the cock-key until water contained in the cylinder is allowed to discharge, and the piston being thus relieved from its support falls and the cab is lowered. This reverse movement of the cab continues until the position of the cock-key is changed by hand, as described, or until, as the cab nears its lowest position, the arm O of the cross-head comes in contact with the knot $m$ on the end of the cord $k$, which cord is tightened as the sheave N automatically turns in the direction last described.

The cab is automatically stopped as it reaches its highest position by the weight $w$ striking the bottom $a'$, which prevents further revolution of the sheaves R and Q and causes the cord $p$ to become slack, which has the effect before described.

The spring connected with the bottom $a'$ prevents a too sudden stopping of the weight $w$.

In having the pulley $S'$ smaller than the one S the distance traversed by the weight $w$ is reduced and may be arranged, as shown in the drawings, to not pass above the first floor of the building.

I claim as my invention—

1. In an elevator, the combination, with a sheave or drum operated from within the cab and the valve-controlling cord secured thereto and adapted to coil thereon, of a second cord coiled on said drum and leading therefrom to a pulley at an elevated point, and a third cord coiled on said elevated pulley and weighted at its free end, substantially as described, whereby the uncoiling of the weighted cord will operate the elevated pulley and, through it and its cord-connection to the drum on the cab, revolve said drum to take up the slack of the valve-controlling cord, as specified.

2. In a hydraulic elevator, the cab provided with a shaft which passes through its wall, having at its inner end a hand-wheel and at its outer end two sheaves, a cord leading from one of the sheaves to an elevated pulley to which it is fastened, a second cord fastened to the said pulley and leading downward to a sheave or drum controlling the admission of water to and from the hydraulic cylinder, a cord leading from the said drum over a pulley with a weight at its end, another cord leading from the said drum over a pulley and down and loosely through a connection of the cross-head or some other moving part of the elevator mechanism, and provided with a knot or ball at its end, and a cord attached to the second sheave on the hand-wheel shaft leading upward to the pulley or drum controlled by a weight and cord, all combined, substantially as and for the purpose specified.

JOHN REILLY.

Witnesses:
 DANL. FISHER,
 WM. T. HOWARD.